(12) United States Patent
Talstra et al.

(10) Patent No.: US 6,701,062 B1
(45) Date of Patent: Mar. 2, 2004

(54) GENERATIONAL COPY CONTROL OF A VIDEO SIGNAL

(75) Inventors: Johan Cornelis Talstra, Eindhoven (NL); Mark Hollar, Palo Alto, CA (US); Kordian Kurowski, San Jose, CA (US); David Collier, Gilroy, CA (US); William Wrobleski, Sunnyvale, CA (US); James Holzgrafe, Morgan Hill, CA (US); Antonius Adrianus Cornelis Maria Kalker, Eindhoven (NL); Derek Nelson, Lexington, KY (US); Patrice Capitant, Los Altos, CA (US); John O. Ryan, Woodside, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/327,996

(22) Filed: Jun. 8, 1999

Related U.S. Application Data

(60) Provisional application No. 60/088,682, filed on Jun. 9, 1998.

(51) Int. Cl.[7] .................................................. H04N 5/91
(52) U.S. Cl. ............................ 386/94; 360/60; 380/203
(58) Field of Search .............................. 386/1, 94, 109; 360/60; 380/201, 203

(56) References Cited

U.S. PATENT DOCUMENTS

| | | | | | |
|---|---|---|---|---|---|
| 4,631,603 A | * | 12/1986 | Ryan | ............................ | 360/60 |
| 5,579,120 A | * | 11/1996 | Oguro | ........................... | 386/94 |
| 5,778,064 A | * | 7/1998 | Kori et al. | ..................... | 386/94 |
| 6,035,094 A | * | 3/2000 | Kori | ............................ | 386/94 |
| 6,131,161 A | * | 10/2000 | Linnartz | ..................... | 380/201 |
| 6,243,139 B1 | * | 6/2001 | Takahashi et al. | .......... | 386/109 |

* cited by examiner

*Primary Examiner*—Thai Tran
*Assistant Examiner*—Christopher Onuaku
(74) *Attorney, Agent, or Firm*—Morrison & Foerster LLP

(57) ABSTRACT

Method and apparatus for providing generational copy control of a video signal. A digital video signal contains content information, first supplemental information and second supplemental information. The first supplemental information is represented by a watermark pattern, the second by a control pattern. Copying of the content information is only permitted if a predetermined combination of the first and second supplemental information is present. Pseudo-sync pulses are added to a blanking interval of an analog video signal converted from a digital video signal, the pulses representing the second supplemental information.

17 Claims, 3 Drawing Sheets

GENERATIONAL COPY CONTROL OF A VIDEO SIGNAL

This application claims the benefit of Provisional Application No. 60/088,682, filed Jun. 9, 1998.

The invention relates to a method for providing generational copy control of a digital video signal, the digital video signal comprising content information, first supplemental information and second supplemental information, the first supplemental information being represented by a watermark pattern, the second supplemental information being represented by a control pattern, the method comprising the step of permitting copying of the content information only if a predetermined combination of the first supplemental information and the second supplemental information is present.

The invention further relates to a device for processing a digital video signal (1), the device comprising means (2) for receiving a digital video signal comprising content information, first supplemental information and second supplemental information, the first supplemental information being represented by a watermark pattern, the second supplemental information being represented by a control pattern.

The invention further relates to a device for providing a generational copy control of a digital video signal comprising content information, first supplemental information and second supplemental information, the first supplemental information being represented by a watermark pattern, the device further comprising means for permitting copying of the content information only if a predetermined combination of the first supplemental information and the second supplemental information is present.

The invention further relates to an analog video signal, being converted from a digital video signal, the analog video signal comprising content information, first supplemental information and second supplemental information, the first supplemental information being represented by a watermark pattern, the second supplemental information being represented by a control pattern.

The invention further relates to a digital video signal comprising content information, first supplemental information and second supplemental information, the first supplemental information being represented by a watermark pattern, the second supplemental information being represented by a control pattern.

The functioning of the method can be understood from WO 98/33325 (PHN 16372), which is hereby incorporated by reference. This document discloses a method of transferring content information and supplemental information. The supplemental information is related to the content information, the supplemental information comprises a control pattern and a watermark pattern related to this control pattern. Marking the content information present in the digital video signal is referred to as watermarking. A watermark must be easy to detect, but difficult to erase or modify without serious degradation of the quality of the content information. Generational copy control requires that the copy status of the supplemental information present in the signal can be measured. Based on these statuses it can be decided whether to allow copying of the content information.

The invention has for an object to provide a method for providing generational copy control of a digital video signal in which the generational copy control can still be exerted in the event that the digital video signal is converted into an analog video signal.

The method in accordance with the invention is characterized in that before performing the step of permitting copying of the content information, the method comprises the steps of converting the digital video signal into an analog video signal and adding pseudo-sync pulses to a blanking interval of the analog video signal, the pseudo-sync pulses representing the second supplemental information.

In the digital video signal a control pattern representing the second supplemental information is present. When converting the digital video signal into the analog video signal pseudo-sync pulses are added representing the second supplemental information.

The invention is based on the recognition that most recorders do not record the complete blanking interval of the analog video signal. Hence, when making a copy the pseudo-sync pulses added to the blanking interval are not recorded. Pseudo-sync pulses are different from the normal sync pulses of a conventional video signal. With the term pseudo-sync pulses, pulses, which extend down to a normal sync tip level and peak to peak white level are meant.

By removing the pseudo-sync pulses, the second supplemental information is changed. The status of the second supplemental information can for example be changed into 'Copy-No-More' when the pseudo-sync pulses are removed. Since permission of copying of the content information is only given if a predetermined combination of the first supplemental information and the second supplemental information is present in the video signal, copying can be prohibited if the second supplemental information has the status 'Copy-No-more'. It can be understood that different combinations of statuses can occur and different predetermined combinations of the first supplemental information and the second supplemental information can therefore be defined. The presence or absence of the pseudo-sync pulses can for example indicate the status. Note that also in the event the pseudo-sync pulses are present, more than one status is possible. The possibility of creating different statuses makes generational copy control possible.

By making no change to the active picture area, any potential degradation of video quality is removed. Another significant advantage of this method is that it takes advantage of existing circuitry in a large percentage of the worldwide installed base of analog and digital cable television and direct broadcast satellite set top boxes (STB, also known as IRD, integrated receiver-decoder) to perform this new generational copy control.

It can be understood from U.S. Pat. No. 4,631,603 that adding positive pulse pairs to the blanking interval of the analog video signal can cause an automatic gain control in a videotape recorder to sense an erroneous indication of video signal level and produce a gain correction that results in an unacceptable videotape recording. In this invention a small subset of the pulses, not causing the erroneous automatic gain control, as disclosed in U.S. Pat. No. 4,631,603 can be used in order to perform generational copy control. This has the advantage that so-called set-top boxes (STB's), utilizing an encoder IC capable of producing these signals, can be used. A significant percentage of STB's are nowadays controllable in the requisite manner to produce the signals per the previous patent.

The invention further relates to a device for processing a digital video signal.

The invention further relates to a device for providing generational copy control of a digital video signal.

Another device for providing generational copy control of a digital video signal is characterized in that the device further comprises means for creating a low bit rate signal by turning off and on the adding of the pseudo-sync pulses.

By turning off and on the adding of the pseudo-sync pulses a low bit rate signal can be created. This could be used to communicate known copy protection elements such as (encryption) keys or numbers.

Another device for providing generational copy control of a digital video signal is characterized in that the device further comprises a detector for detecting a characteristic of an analog video signal provided from an analog recording device and means for blocking the analog video signal if the detector detects a characteristic of the analog video signal.

As said above, most recorders do not or not properly record the complete blanking interval of the analog video signal. In the event a recorder does record the part of the blanking interval where the pseudo-sync pulses are present, the generational copy control can not be exerted. In order to overcome this drawback, the analog video signal is inspected whether a characteristic of an analog video signal provided from an analog recorder, e.g. a VCR is present. If such a characteristic is detected, copying is prohibited.

Another device for providing generational copy control of a digital video signal is characterized in that the characteristic is a stability status of a time base of the video signal.

An analog VCR signal usually contains to some extent time base instabilities. Various mechanisms exist for detecting these instabilities. One method is to look for perturbations to a horizontal phase lock loop, which exceed a particular threshold characterizing a VCR. If these instabilities are detected, the presence of for example of watermark with a 'Copy-No-More'-status must result in preventing copying of the content. The status of the second supplementary information, represented by the pseudo-sync pulses, is of no importance in that case.

The invention further relates to an analog video signal.

The invention further relates to a digital video signal.

BRIEF DESCRIPTION OF THE DRAWINGS

The invention will be further described in the following figure description in which.

DETAILED DESCRIPTION

Figure 1:
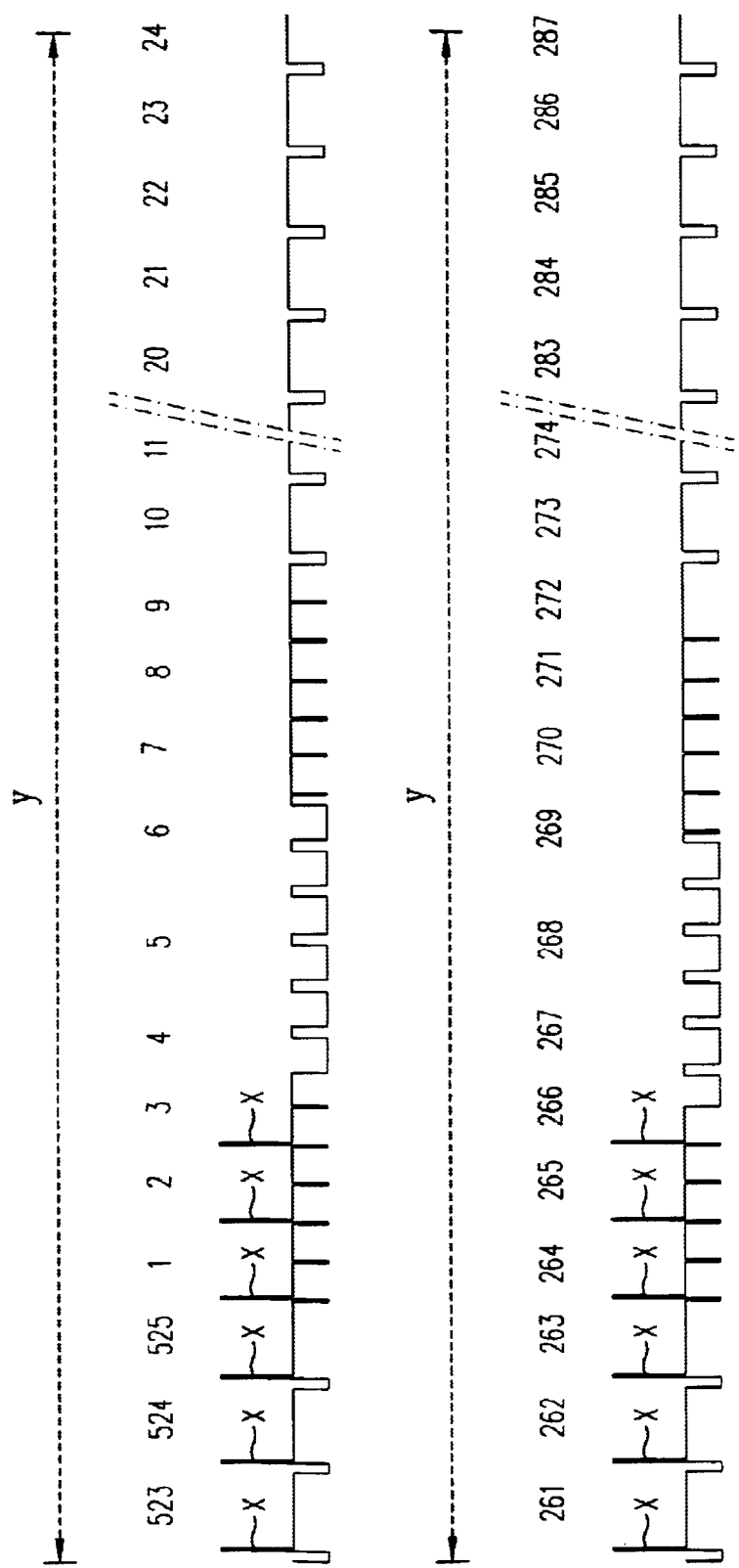
FIG. 1 shows a possible location of the pseudo-sync pulses in an NTSC/525 analog video signal.
Figure 2:
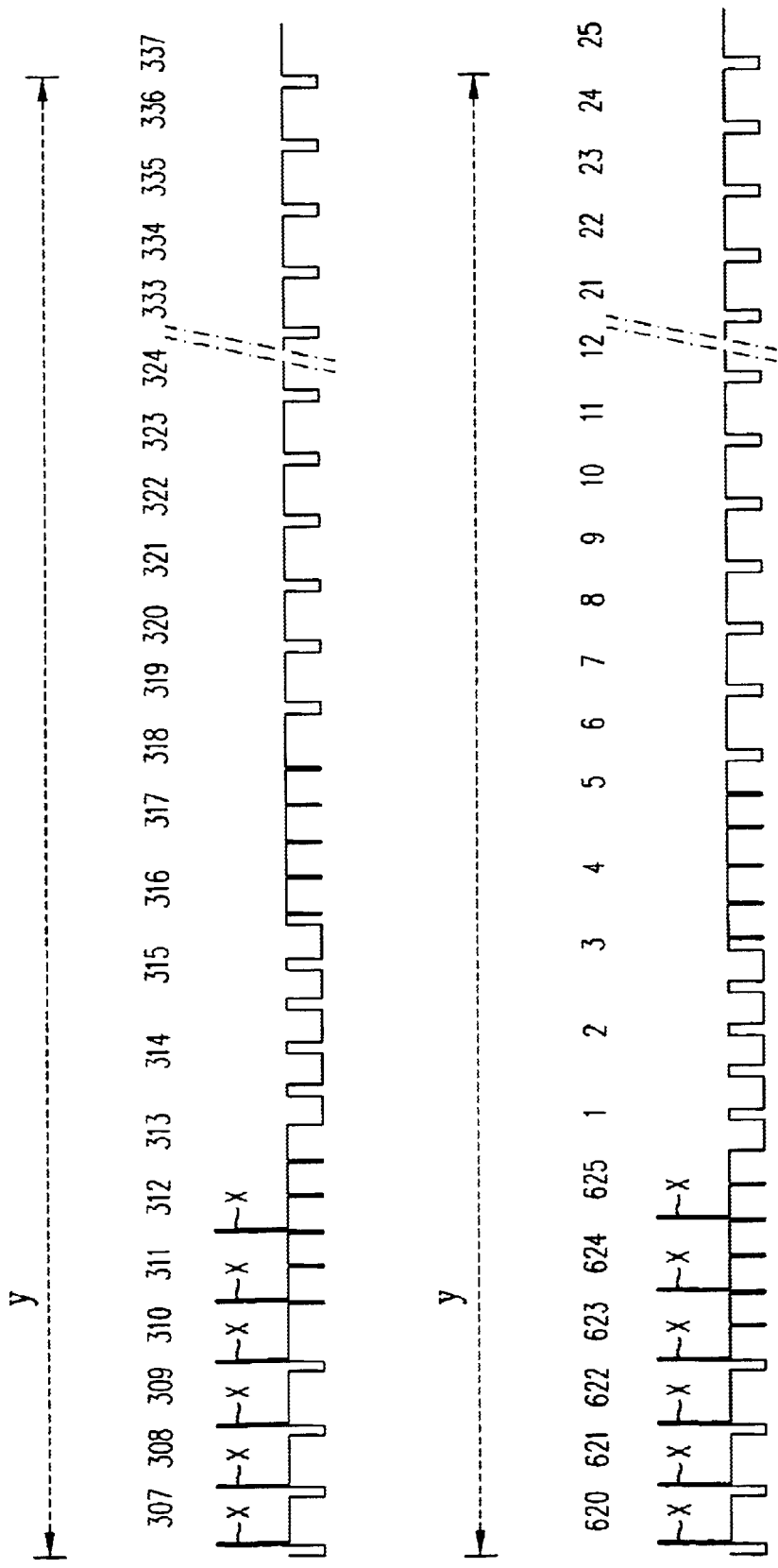
FIG. 2 shows as an example a possible location of the pseudo-sync pulses in a PAL/625 video signal.

An example of the use of the pseudo-sync pulses according to the invention is described with reference to FIGS. 1 and 2. In FIG. 1 the pulses are located on lines 1–3, 261–265 and 523–525 of an NTSC/525 analog video signal. The vertical blanking interval Y extends from line 523 to line 23 and line 261 to 286. The numbers in FIG. 1 are according to NTSC standard line numbering, known to a person skilled in the art. The first line number of the active picture area is line 24 in the odd part of the picture area, shown in the upper part of FIG. 1 and line 287 in the even part of the picture area, shown in the bottom part of FIG. 1. In FIG. 2 the pulses are located on lines 307–312 and 620–625 of a PAL/625 video signal. The vertical blanking interval Y extends from line 307 to line 336 and line 620 to 24. The numbers in FIG. 2 are according to PAL standard line numbering, known to a person skilled in the art. The first line number of the active picture area is line 337 in the odd part of the picture area, shown in the upper part of FIG. 2 and line 25 in the even part of the picture area, shown in the bottom part of FIG. 2.

It must be understood that the invention is not restricted to pseudo-sync pulses located on the lines as shown in FIG. 1 or FIG. 2. The pseudo-pulses can be located in the whole blanking interval. It must also be understood that the number of pseudo-sync pulses can vary.

For the pseudo-sync pulses ordered pseudo-sync pulses as described in U.S. Pat. No. 4,631,603 can be used for instance. The latter document discloses a video signal modified so that a television receiver will provide a normal picture from the modified video signal while videotape recording of the modified video signal produces generally unacceptable pictures. In order to achieve this, anti-copy signals are present in the modified video signal. These anti-copy signals consist of ordered pseudo-sync pulses within a blanking interval of the signal. These pulses cause an automatic gain control in a videotape recorder to sense an erroneous indication of video signal level and produce a gain correction that results in an unacceptable videotape recording. It must be understood that not only the pulses as described in U.S. Pat. No. 4,631,603 can be used in this invention. Other VBI signals could also be used as long as they have the properties described above. It must also be understood that not only the pulses in the VBI can be used. Also pulses in the HBI, horizontal blanking interval, can be used. Specifically, they must be part of the analog video signal, which will generally not be recorded faithfully on analog or digital recorders. This ensures that even non-compliant devices will remove the generational control signals. The invention is not restricted to video signals of the PAL or NTSC format, other formats can also be used, like e.g. SECAM.

In this invention, a small subset of the anti-copy protection signals as described in U.S. Pat. No. 4,631,603 can be used. In FIGS. 1 and 2 is shown that a tag, comprising of these anti-copy protection signals, is located in the vertical blanking area of the analog video in an area which is generally not properly recorded in a digital recorder. This tag produces no artifacts with VHS VCR's. This is because the anti-copy application as described in U.S. Pat. No. 4,631,603 required the combination of all of the signals and in this application a small enough subset has been selected that the effect no longer exists. This analog tag can for example be activated remotely in so-called set-top boxes (STB's) utilizing an encoder IC capable of producing these signals.

As described before, only 1 bit or state is communicated by means of the pseudo-sync pulses; however, by turning this bit or state on and off at some rate, a low bit rate signal can be created. This could be used to communicate known copy protection elements such as (encryption) keys or numbers. In certain circumstances, this might increase the security level of a system employing the described technique.

Some systems providing a method for generational copy control use a control pattern situated in the active picture area. For instance a chroma domain active picture area tag can be used. In these systems, this tag must be removed to change the generational copy status of the material, e.g. from 'Copy-Once' to 'Copy-No-More'. Other methods propose the addition of a second watermark to an original 'Copy-Once' watermark to designate a particular piece of video as 'Copy-No-More'. Both of these methods have the disadvantage that in the compressed domain, such as MPEG, as a minimum, a partial MPEG de-code and re-encode are required. This has implications both on the cost and the potential video quality after performing this transform.

In Table 1, Table 2 and Table 3, different possible situations according to the invention are shown. Table 1 shows as an example different possible situations in case the watermark state is 'No-Watermark', Table 2 shows as an example different possible situations in case the watermark state is 'Copy-Once' and Table 3 shows as an example different possible situations in case the watermark state is 'Copy-Never'.

TABLE 1

| Watermark state: 'No-Watermark' | Time base stable | Time base unstable |
|---|---|---|
| Pseudo-sync pulses present | Allow copy | Allow copy |
| Pseudo-sync pulses not present | Allow copy | Allow copy |

TABLE 2

| Watermark state: 'Copy-Once' | Time base stable | Time base unstable |
|---|---|---|
| Pseudo-sync pulses present | Allow copy | Prohibit copy |
| Pseudo-sync pulses not present | Prohibit copy | Prohibit copy |

TABLE 3

| Watermark state: 'Copy-Never' | Time base stable | Time base unstable |
|---|---|---|
| Pseudo-sync pulses present | Prohibit copy | Prohibit copy |
| Pseudo-sync pulses not present | Prohibit copy | Prohibit copy |

Depending on the combination of the status of the pseudo-sync pulses, the status of the watermark pattern and the stability of the time base, copying of the video signal is allowed or prohibited. As said before, watermarking is the marking of the content information present in the digital video signal. In WO 97/13248 (PHN 15391), which is hereby incorporated by reference, a method is disclosed for embedding the watermark pattern in the signal such that it is easy to detect, but difficult to erase or modify without serious degradation of the quality of the content information.

It must be noted that in these Tables, as a characteristic of the analog video signal provided from an analog VCR the time base stability is chosen. However, the invention is not restricted to only this characteristic, but is applicable to all characteristics of an analog video signal provided from any recording, digital or analog. It is known to a person skilled in the art that such a signal has a number of characteristics, which are used in the method according to the invention to strengthen a copy protection system, which uses watermarks. In the presence of these characteristic signatures, the presence of a copy-once status of the watermark is an indication that an analog VCR copy has been made. Under this circumstance, a subsequent recorder can prevent an additional recording. Characteristic signatures include various types of long and short time-base errors, head switch perturbations and non-standard sync-to-subcarrier relationships, among others.

In these Tables, as a digital domain tag (or copy status indicator) the status of the watermark is used, as an analog domain tag to the status of the pseudo-sync pulses is used. These statuses together with the stability of the time base are used for performing generational copy control.

In Table 1, the hidden video watermark indicates 'No-Watermark'. In this Table can be seen that copying is allowed irrespective of the status of the pseudo-sync pulses or the stability of the time base copying.

In Table 2, the hidden video watermark indicates 'Copy-Once'. In this Table can be seen that copying is only allowed when the pseudo-sync pulses are detected as well as the time base of the video signal is stable. As said before, generational copy control is possible since most (compliant and non-compliant) digital recorders strip the pseudo-sync pulses when making a copy and since analog recorders (e.g. VHS, Betamax, Hi8 etc.) introduce detectable time base instabilities. It can be seen in Table 2 that if these instabilities are detected a subsequent digital recorder is not allowed to make a recording.

In Table 3, the hidden video watermark indicates 'Copy-Never'. In this Table can be seen that irrespective of the status of the pseudo-sync pulses or the stability of the time base copying is prohibited.

Figure 3:
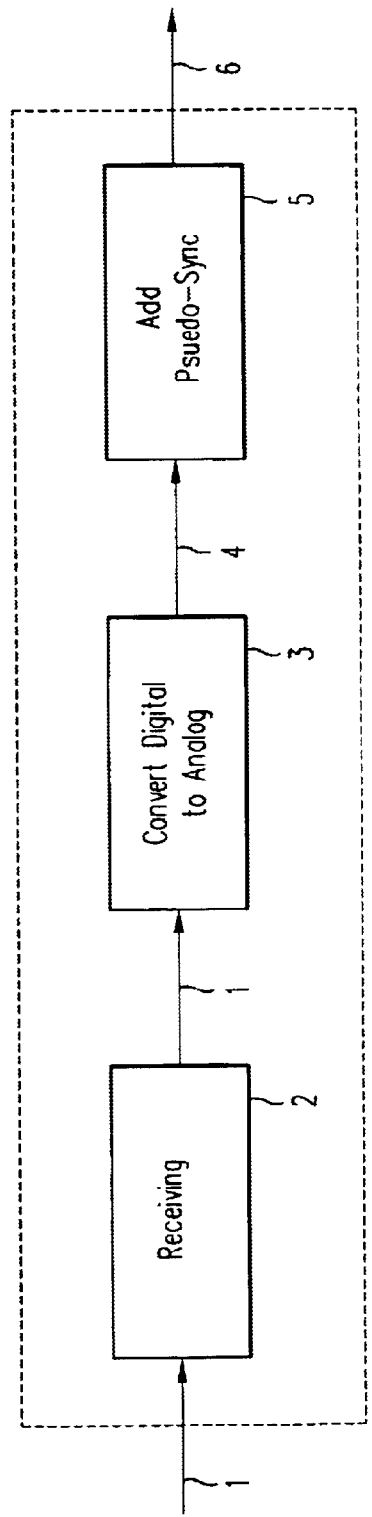
FIG. 3 shows a device for converting a digital video signal into an analog video signal according to the invention.

In FIG. 3 a device for converting a digital video signal into an analog video signal according to the invention is shown. A digital video signal 1 received in means 2 for receiving a digital video signal. The digital video signal can have different sources. The signal can for example be supplied from a set-top box, the set-top box having received the signal via a broadcasting connection. It can also become available by reading out a record carrier. The digital video signal 1 comprises of content information, first supplemental information and second supplemental information. The first supplemental information is represented by a watermark pattern, the second supplemental information is represented by a control pattern. The digital video signal 1 is output from the means 2 for receiving the digital video signal and received in means 3 for converting the digital video signal into an analog video signal. After being converted the now analog video signal 4 is received in means 5 for adding pseudo-sync pulses. In these means 5 for adding pseudo-sync pulses, pseudo-sync pulses representing the second supplemental information are added to the blanking interval of the analog video signal. These pulses, forming an analog tag, can for example be activated in so-called set-top boxes (STB's) utilizing an encoder IC capable of producing these signals. In FIG. 1 and FIG. 2 is shown on which positions these pulses can be located. The modified video signal 6, now comprising of content information, first supplemental information being represented by the status of the watermark pattern and second supplemental information represented by the status of the pseudo-sync pulses is outputted.

Figure 4:
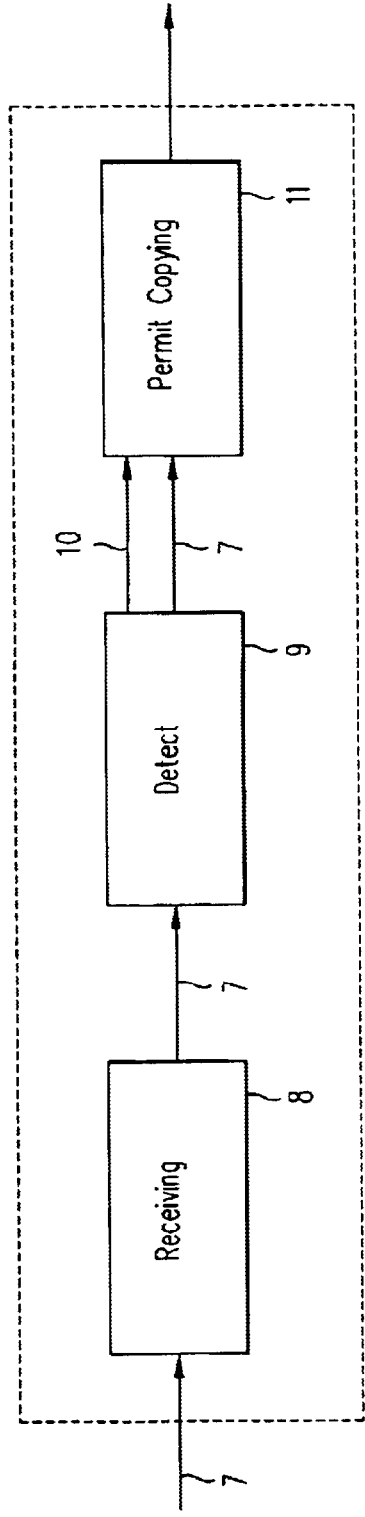
FIG. 4 shows a device for providing generational copy control of a digital video signal according to the invention.

In FIG. 4 a device for providing generational copy control of a video signal according to the invention is shown. An analog video signal 7 for example the modified video signal 6 as described in FIG. 3, is received in means 8 for receiving an analog video signal. The analog video signal 7 comprises of content information, first supplemental information and second supplemental information. The analog video signal 7 is output from the means 8 for receiving the analog video signal and received in a detector 9. In this detector 9, the statuses of the first supplemental information, the second supplemental information and the stability of the time base of the analog video signal are detected. This status information 10 is output, together with the analog video signal to means 11 for permitting copying of the content information. This means 11 for permitting copying of the content information decides, for example by using Table 1, Table 2 or Table 3, whether copying of the content information must be allowed or prohibited. If copying of the content information is allowed the analog video signal is output.

It must be noted that where in the foregoing Figure description a digital video signal was mentioned, also an analog video signal can be used. The first and second supplemental information must than be stored in the analog signal. In that case, the first supplemental information can be an analog watermark, the second supplemental information can for example be a signal stored in the blanking interval indicating the use or non-use of the pseudo-sync pulses. The entrance signal of for example a STB can thus be a digital signal as well as an analog signal.

A separate invention comprises copy control of a digital video signal. This digital video signal comprises content information and only one sort of supplemental information, namely the supplemental information represented by a control pattern. Permitting copying of the content information is now decided on the status of the supplemental information. Pseudo-sync pulses present in the blanking interval of the analog video signal now represent the second supplemental information. In this manner, no second kind of supplemental information is used in order to perform copy control. For example, turning off and on the adding of the pseudo-sync pulses can be used to create a low bit rate signal. This could be used to communicate known copy protection elements such as (encryption) keys or numbers. Therefore, this low bit rate signal can be used to copy control the digital video signal. For example, a number present in this signal can be combined with a identification number provided by the user of the content information in order to gain permission to copy this content information. It must be understood that this separate invention can also be extended to generational copy control.

Whilst the invention has been described with reference to preferred embodiments thereof, it is to be understood that these are not limitative examples. Thus, various modifications may become apparent to those skilled in the art, without departing from the scope of the invention, as defined in the claims.

Further, the invention lies in each and every novel feature or combination of features.

What is claimed is:

1. A method for copy control of a digital video signal, the digital video signal having content information, first supplemental information and second supplemental information, the first supplemental information being represented by a watermark pattern, the second supplemental information being represented by a control pattern, the method comprising:

permitting copying of the content information only if a predetermined combination of the first supplemental information and the second supplemental information is present, and before copying of the content information, converting the digital video signal into an analog video signal and adding pseudo-sync pulses to a blanking interval of the analog video signal, the pseudo-sync pulses representing the second supplemental information.

2. Device for processing a digital video signal comprising;

means for receiving a digital video signal having content information, first supplemental information and second supplemental information, the first supplemental information being represented by a watermark pattern, the second supplemental information being represented by a control pattern, means for converting the digital video signal into an analog video signal, means for outputting the analog video signal, and means for adding pseudo-sync pulses representing the second supplemental information to a blanking interval of the analog video signal.

3. Device of claim 2, further comprising means for creating a low bit rate signal by turning off and on the adding of the pseudo-sync pulses.

4. Device for copy control of a digital video signal having content information, first supplemental information and second supplemental information, the first supplemental information being represented by a watermark pattern, the device comprising;

means for permitting copying of the content information only if a predetermined combination of the first supplemental information and the second supplemental information is present, means for receiving an analog video signal converted from the digital video signal, and means for recovering the second supplemental information from pseudo-sync pulses present in a blanking interval of the analog video signal.

5. Device of claim 3, wherein the digital video signal is from a set-top box.

6. Device of claim 3, wherein the digital video signal from a record carrier.

7. Device of claim 3, further comprising a detector which detects a characteristic of an analog video signal provided from an analog recording device, and means for blocking the analog video signal if the detector detects a characteristic of the analog video signal.

8. Device of claim 7, wherein the characteristic is a stability status of a time base of the video signal.

9. Device of claim 3, further comprising means for recording.

10. A method of processing an analog video signal having content information, first supplemental information and second supplemental information, the method comprising:

representing the first supplemental information by a watermark pattern in the analog video signal, representing the second supplemental information by a control pattern, and providing pseudo-sync pulses in the blanking interval of the analog video signal, the pseudo-sync pulses representing the control pattern.

11. A method of processing a digital video signal having content information, first supplemental information and second supplemental information, the method comprising:

representing the first supplemental information by a watermark pattern, representing the second supplemental information by a control pattern, wherein the digital video signal comprises the control pattern indicating that an analog video signal converted from the digital signal is to include pseudo-sync pulses.

12. A method for generating a signal, comprising:

providing content information;

providing first supplemental information;

representing the first supplemental information by a watermark pattern;

providing second supplemental information;

representing the second supplemental information by a control pattern which is a set of pseudo-sync pulses;

combining the content information, watermark pattern, and set of pseudo-sync pulses to form an analog video signal, wherein the set of pseudo-sync pulses are provided in a blanking interval of the analog video signal.

13. A method of processing a signal, comprising:

providing content information;

providing first supplemental information;

representing the first supplemental information by a watermark pattern;

providing second supplemental information;

representing the second supplemental information by a control pattern;

combining the content information, watermark pattern, and control pattern to form a digital video signal, wherein the control pattern indicates that upon conversion of the digital video signal into an analog video signal that the analog video signal is to carry pseudo-sync pulses.

14. Device for processing a video signal comprising:

a receiver adapted to receive a digital video signal having content information, first supplemental information represented by a watermark, and second supplemental information represented by a control pattern;

a digital to analog converter coupled to the receiver; and a circuit coupled to the digital to analog converter to receive therefrom the converted signal and which adds to a blanking interval of the converted signal pseudo-sync pulses representing the control pattern and used to control subsequent copying.

15. Device for processing a video signal comprising:

a receiver for receiving a modified analog video signal having content information, first supplemental information, and second supplemental information represented by a control pattern;

a detector coupled to the receiver and which detects the status of the first and second supplemental information; and a circuit coupled to the detector which permits copying of the analog video signal if the status of the first and second supplemental information is a predetermined combination.

16. The device of claim 15, wherein the first supplemental information is represented by a watermark and the second supplemental information relates to pseudo-sync pulses in a blanking interval of the analog video signal.

17. The device of claim 15, wherein the detector also detects stability of a time base of the analog video signal.

* * * * *